(12) United States Patent
Song

(10) Patent No.: US 9,457,767 B2
(45) Date of Patent: Oct. 4, 2016

(54) WIPER DEVICE

(71) Applicant: CAP CORPORATION, Daegu (KR)

(72) Inventor: Kyoung Joon Song, Daegu (KR)

(73) Assignee: CAP Corporation, Daegu (KR)

( * ) Notice: Subject to any disclaimer, the term of this patent is extended or adjusted under 35 U.S.C. 154(b) by 288 days.

(21) Appl. No.: 14/146,112

(22) Filed: Jan. 2, 2014

(65) Prior Publication Data

US 2014/0109336 A1 Apr. 24, 2014

Related U.S. Application Data

(63) Continuation of application No. PCT/KR2012/004456, filed on Jun. 7, 2012.

(30) Foreign Application Priority Data

Jul. 1, 2011 (KR) .................. 10-2011-0065585

(51) Int. Cl.
*B60S 1/38* (2006.01)

(52) U.S. Cl.
CPC ............ *B60S 1/3801* (2013.01); *B60S 1/3806* (2013.01); *B60S 2001/3813* (2013.01); *B60S 2001/3815* (2013.01)

(58) Field of Classification Search
CPC ............... B60S 1/3801; B60S 1/3806; B60S 2001/3813; B60S 2001/3815; B60S 2001/3843
USPC .......................................... 15/250.44, 250.46
See application file for complete search history.

(56) References Cited

U.S. PATENT DOCUMENTS

| 7,603,742 B2 | 10/2009 | Nakano et al. |
| 8,181,308 B2 | 5/2012 | Kwon et al. |
| 8,375,504 B2 | 2/2013 | Kim et al. |
| 2010/0139027 A1* | 6/2010 | An .................. B60S 1/3801 15/250.361 |

FOREIGN PATENT DOCUMENTS

DE     4116968 A1 *  11/1992

OTHER PUBLICATIONS

PCT International Search Report mailed Dec. 26, 2012, received in corresponding PCT Application No. PCT/KR12/04456, 2 pgs.
PCT International Preliminary Report on Patentability with Translation of Written Opinion, mailed Jan. 7, 2014, received in corresponding PCT Application No. PCT/KR12/04456, 7 pgs.

* cited by examiner

*Primary Examiner* — Gary Graham
(74) *Attorney, Agent, or Firm* — Grossman Tucker Perreault & Pfleger, PLLC

(57) ABSTRACT

A wiper device for removing foreign substances that are stuck on a windshield in accordance with an embodiment of the present invention includes: a contact member configured for wiping out the foreign substances; a support member made of an elastic material and configured for elastically supporting the contact member in such a way that the contact member is in close contact with the windshield; a yoke configured for supporting the support member; a center cover configured for covering the yoke and having a wiper arm connected thereto; and an extension cover having one end thereof hinge-coupled to the center cover and the other end thereof extended in a lengthwise direction of the support member. The yoke can be hinge-coupled with the center cover or the extension cover and can have a hinge-axle thereof arranged in a same line as a hinge-axle connecting the center cover with the extension cover.

8 Claims, 4 Drawing Sheets

WIPER DEVICE

CROSS REFERENCE TO RELATED APPLICATIONS

This application is a continuation of PCT/KR2012/004456 filed Jun. 7, 2012, which claims the benefit of Korean Patent Application No. 10-2011-0065585, filed with the Korean Intellectual Property Office on Jul. 1, 2011, the disclosure of which is incorporated herein by reference in its entirety.

BACKGROUND OF THE INVENTION

1. Technical Field

The present invention relates to a wiper device.

2. Background Art

Generally, visibility is interfered and safety is compromised if the windshield of a motor vehicle that is in motion is contaminated by the dust or various foreign substances in the air or the rain or snow due to weather conditions. Accordingly, motor vehicles are equipped with a wiper device for wiping out the rain, snow or other foreign substances from the windshield in order to secure the visibility for safe driving of the driver.

One of the conventional types of wiper devices is a tournament structure of wiper device, which has multiple layers of levers, end of each lever supporting the blade.

In the tournament structure of wiper device, a plurality of levers are connected by use of a number of joints, and the complicated multiple layer structure causes contact pressure to be leaked while the pressing force is delivered.

Moreover, the plurality of joints increases the height of the wiper device and are difficult to be covered entirely during the activation of the wiper device. Accordingly, the joints of the tournament structure are exposed and can be corroded by the rain or snow, or even can be frozen during the winter. In addition, since the tournament structure is constructed with multiple layers of levers, the appearance is not very attractive.

SUMMARY OF THE INVENTION

The present invention provides a wiper device that can transfer contact pressure without using a complicated joint structure.

The wiper device for removing foreign substances that are stuck on a windshield in accordance with an embodiment of the present invention includes: a contact member configured for wiping out the foreign substances; a support member made of an elastic material and configured for elastically supporting the contact member in such a way that the contact member is in close contact with the windshield; a yoke configured for supporting the support member; a center cover configured for covering the yoke and having a wiper arm connected thereto; and an extension cover having one end thereof hinge-coupled to the center cover and the other end thereof extended in a lengthwise direction of the support member. The yoke can be hinge-coupled with the center cover or the extension cover and can have a hinge-axle thereof arranged in a same line as a hinge-axle connecting the center cover with the extension cover.

The yoke can have a first hinge groove formed therein, and the extension cover can have a first hinge protrusion formed inside thereof for insertion in the first hinge groove. The extension cover can have a second hinge groove formed outside thereof corresponding to a position of the first hinge protrusion, and the center cover can have a second hinge protrusion formed inside thereof for insertion in the second hinge groove.

The yoke can have a first hinge groove formed therein, and the center cover can have a first hinge protrusion formed inside thereof for insertion in the first hinge groove. The center cover can have a second hinge groove formed outside thereof corresponding to a position of the first hinge protrusion, and the extension cover can have a second hinge protrusion formed inside thereof for insertion in the second hinge groove.

The first hinge protrusion can have a greater diameter than the second hinge protrusion.

The other end of the extension cover can be coupled to at least one of the support member and the contact member.

At least one of the center cover and the extension cover can have a fin formed thereon for receiving a headwind from moving forward.

DETAILED DESCRIPTION OF THE INVENTION

Hereinafter, an embodiment of the present invention will be described in detail with reference to the accompanying drawings.

Figure 1:
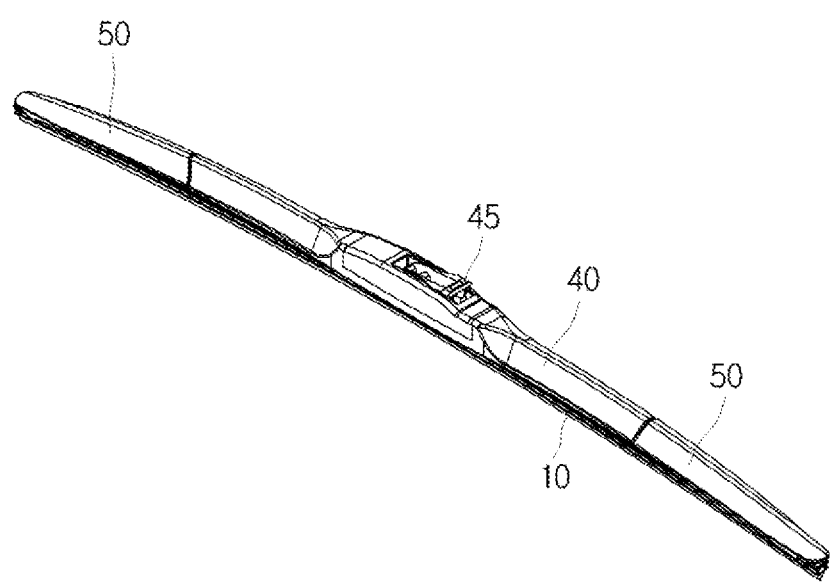
FIG. 1 is a perspective view showing a wiper device in accordance with an embodiment of the present invention.
Figure 2:
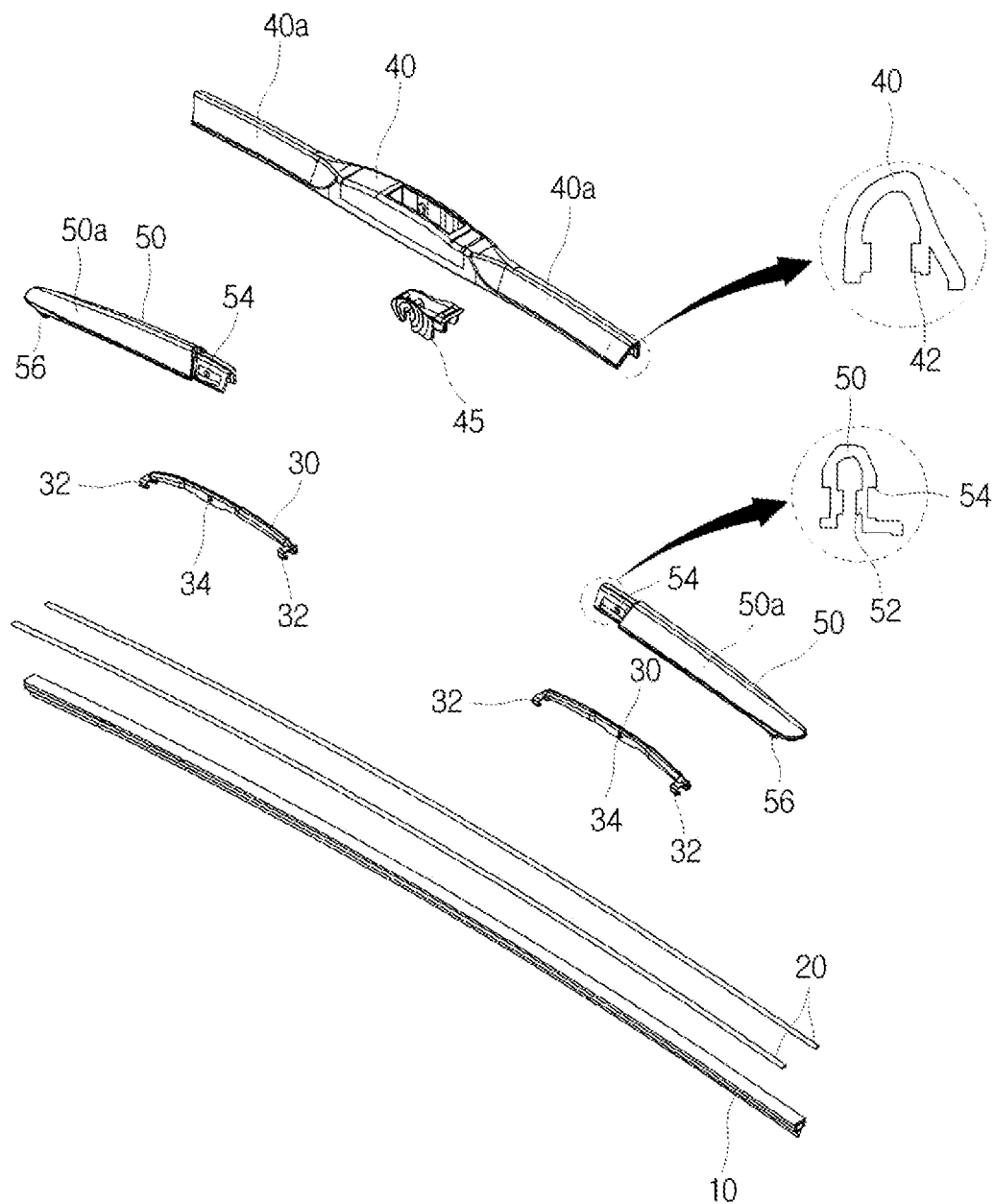
FIG. 2 is an exploded perspective view showing the wiper device in accordance with an embodiment of the present invention.

FIG. 1 is a perspective view showing a wiper device in accordance with an embodiment of the present invention, and FIG. 2 is an exploded perspective view showing the wiper device in accordance with an embodiment of the present invention.

The wiper device in accordance with an embodiment of the present invention is a device for removing foreign substances that are stuck on a windshield and includes a contact member 10, a support member 20, a yoke 30, a center cover 40 and an extension cover 50.

The contact member 10 is a part that is in close contact with the windshield and wipes out foreign substances. The contact member 10 of the present embodiment can be any kind of conventional contact member, for example, the rubber-made wiper.

The support member 20 is a part that elastically supports the contact member 10 so that the contact member 10 is in close contact with the windshield.

As shown in FIG. 2, a pair of rail springs having a predetermined curvature and elastic force according to the shape of the windshield can be used as the support member 20 to allow the contact member 10 to be in close contact with a curved surface of the windshield.

Here, the contact member 10 has installation grooves (not shown) formed in lengthwise directions on either lateral surface thereof. Accordingly, the pair of rail springs can be inserted in and coupled to the pair of installation grooves, respectively.

The yoke 30, which is a part that supports the support member 20, can be hinge-coupled to the center cover 40 or the extension cover 50 to have contact pressure transferred thereto and to re-transfer the transferred contact pressure to the support member 20.

As shown in FIG. 2, the yoke 30 in accordance with the present embodiment has gripping portions 32 formed on either end thereof for holding the support member 20 and the contact member 10. Moreover, the yoke 30 can have a first hinge groove 34 formed in a middle thereof for hinge-coupling with the extension cover 50.

The center cover 40 and the extension cover 50 are parts that cover the yoke 30 and transfer the contact pressure to the yoke 30. For this, the center cover 40 is connected with a wiper arm and has the extension cover 50 hinge-coupled thereto. Moreover, the center cover 40 or the extension cover 50 has the yoke 30 hinge-coupled thereto.

Particularly, in the present embodiment, the yoke 30 is also coupled on a hinge-axle that connects the center cover 40 with the extension cover 50. That is, the hinge-axle that connects the center cover 40 with the extension cover 50 is arranged on a same line as a hinge-axle that couples the yoke 30 to the center cover 40 or the extension cover 50. Accordingly, the contact pressure transferred from the wiper arm to the center cover 40 is directly transferred to the contact member 10 through a single joint only, minimizing the loss of contact pressure by joints. In addition, as multiple layers of joints are not introduced, the overall height of the wiper device becomes smaller, providing a simpler appearance. Here, being arranged on a same line means not only that the hinge-axle for coupling the yoke 30 to the center cover 40 or the extension cover 50 is perfectly aligned with the hinge-axle for connecting the center cover 40 with the extension cover 50 but also that these hinge-axles are practically arranged on a same axle by taking an allowance of assembly and process into consideration.

As illustrated in FIGS. 1 and 2, the center cover 40 in accordance with the present embodiment is arranged above a middle portion of the support member 20 and has a pair of the extension covers 50 hinge-coupled to either end thereof. In addition, the yoke 30 is accommodated in and covered by the center cover 40 and the extension cover 50 and is hinge-coupled with the extension cover 50 at a middle portion thereof.

Specifically, the center cover 40 has an adapter 45 coupled thereto for connection with the wiper arm. Moreover, the center cover 40 can be formed to have an upside-down "U" shaped cross-section so as to have an accommodation space formed therein. Accordingly, the center cover 40 can have an end of the extension cover 50 and the yoke 30 accommodated therein.

One end of the extension cover 50 is inserted in and hinge-coupled to the center cover 40, and the other end of the extension cover 50 is extended in a lengthwise direction of the support member 20. Moreover, the extension cover 50 can be formed to have an upside-down "U" shaped cross-section so as to have an accommodation space formed therein. Accordingly, the extension cover 50 can have the yoke 30 accommodated therein and hinge-coupled thereto.

Particularly, the extension cover 50 in accordance with the present embodiment can have a first hinge protrusion 52 formed inside thereof and a second hinge groove 54 formed outside thereof so as to be readily coupled with the center cover 40 and the yoke 30 on a same hinge-axle.

Figure 3:
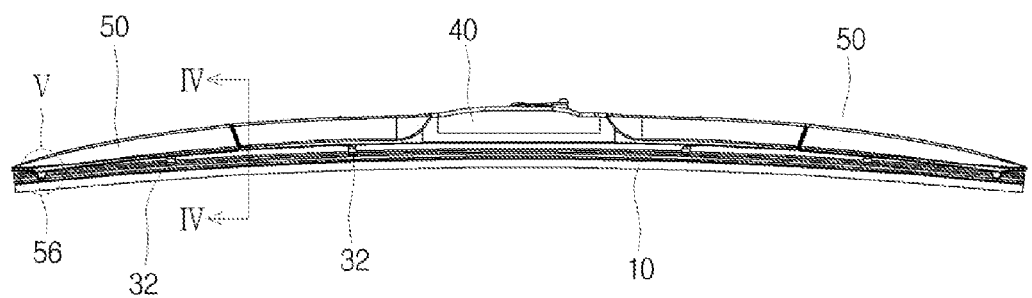
FIG. 3 is a front view showing the wiper device in accordance with an embodiment of the present invention.
Figure 4:
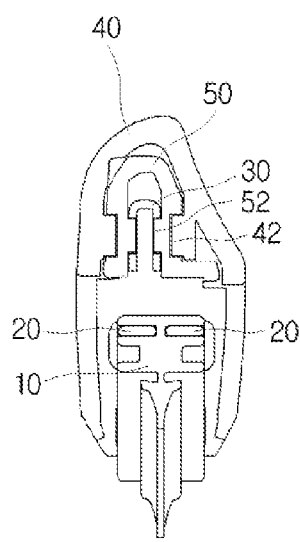
FIG. 4 is a cross-sectional view showing a connection structure of the wiper device in accordance with an embodiment of the present invention.

FIG. 3 is a front view showing the wiper device in accordance with an embodiment of the present invention, and FIG. 4 is a cross-sectional view showing a connection structure of the wiper device in accordance with an embodiment of the present invention.

As illustrated in FIG. 2 and FIG. 4, the extension cover 50 in accordance with the present embodiment uses the first hinge protrusion 52 and the second hinge groove 54 formed inside and outside thereof, respectively, to be connected with the yoke 30 an the center cover 40 on the same hinge-axle. Accordingly, the extension cover 50 can be readily hinge-coupled with the yoke 30 and the center cover 40 without introducing an additional axle member, reducing the number of parts constituting the wiper device and allowing the wiper device to be assembled easily.

Specifically, the yoke 30 accommodated in the extension cover 50 has a first hinge groove 34 formed therein, and the extension cover 50 has the first hinge protrusion 52 formed inside thereof for insertion in the first hinge groove 34, thereby allowing the yoke 30 to be hinge-coupled with the extension cover 50. Moreover, the second hinge groove 54 is formed on the outside of one end of the extension cover 50, and a second hinge protrusion 42 for insertion in the second hinge groove 54 is formed inside the center cover 40, in which the one end of the extension cover 50 is accommodated, thereby allowing the center cover 40 and the extension cover 50 to be hinge-coupled with each other.

Here, the second hinge groove 54 is arranged to correspond to a position of the first hinge protrusion 52 so that the yoke 30, the extension cover 50 and the center cover 40 are rotatably coupled with one another on a same axle.

Although it is described in the present embodiment that the one end of the extension cover 50 is connected by being inserted in the center cover 40, the present invention shall not be limited to this structure, and it is also possible that the extension cover 50 and the center cover 40 are connected with each other in various hinge structures. For instance, it is also possible that one end of the center cover 40 is inserted in and hinge-coupled with the extension cover 50. Here, the center cover 40 can have a first hinge protrusion formed inside thereof for insertion in the first hinge groove 34 of the yoke 30, and can have a second hinge groove formed outside thereof corresponding to a position of the first hinge protrusion. Moreover, the extension cover 50 can have a second hinge protrusion formed inside thereof for insertion in the second hinge groove, thereby allowing the yoke 30, the extension cover 50 and the center cover 40 to be rotatably connected with one another on a same axle.

Moreover, it is possible that the first hinge protrusion is formed to have a greater diameter than the second hinge protrusion so as to enhance the rigidity of the extension cover 50 or the center cover 40 having the first hinge protrusion and the second hinge groove formed inside and outside thereof, respectively.

Figure 5:
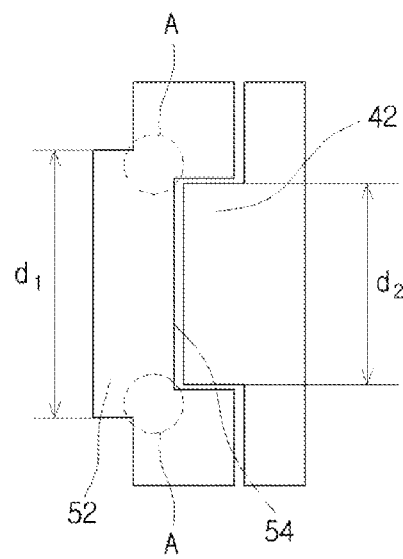
FIG. 5 shows a different type of first and second hinge protrusions in the wiper device in accordance with an embodiment of the present invention.

FIG. 5 shows a different type of first and second hinge protrusions in the wiper device in accordance with an embodiment of the present invention. As illustrated in FIG. 5, the extension cover 50 in accordance with the present embodiment has the first hinge protrusion 52 and the second hinge groove 54 formed on either side of a lateral wall. Accordingly, a narrow area A is inevitably formed between the first hinge protrusion 52 and the second hinge groove 54. Here, in case the second hinge groove 54 has a greater diameter than the first hinge protrusion 52 (i.e., d1<d2), the wall at the narrow area A becomes thin, increasing the possibility of damage by a shock or impact. Therefore, in the present embodiment, the first protrusion 52 is formed to have a greater diameter than the second hinge groove 54 (that is, the first hinge protrusion 52 is formed to have a greater diameter than the second protrusion 42, i.e., d1>d2), the extension cover 50 is prevented from having a narrow area and hence from having a lowered rigidity.

Moreover, the extension cover 50 in accordance with the present embodiment can be coupled to at least one of the support member 20 and the contact member 10, making it possible to enhance a conformity at an end portion thereof.

Figure 6:
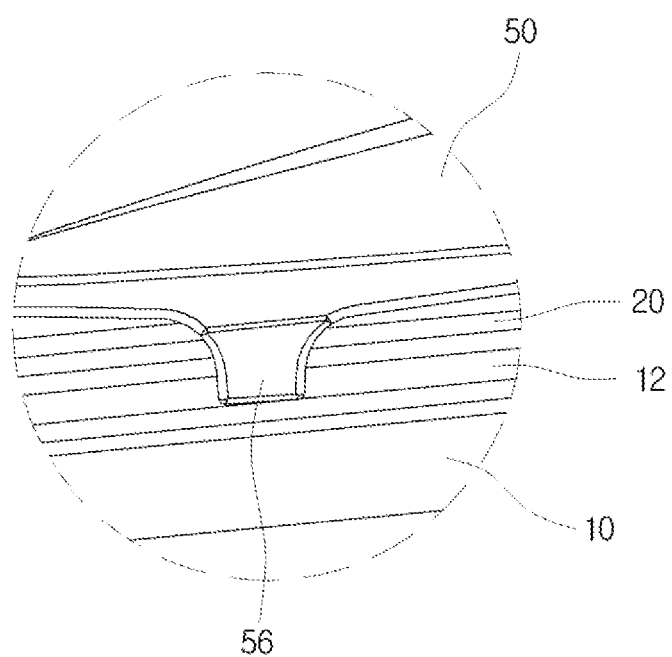
FIG. 6 shows an end portion of an extension cover of the wiper device in accordance with an embodiment of the present invention.

FIG. 6 shows the end portion of the extension cover of the wiper device in accordance with an embodiment of the present invention.

As shown in FIG. 6, the extension cover 50 in accordance with the present embodiment has an inwardly-protruded support portion 56 formed at the other end thereof, and the support portion 56 is inserted in a groove 12 formed on the contact member 10 to support the contact member 10. Accordingly, the contact pressure transferred to the extension cover 50 can be evenly transferred to an end of the contact member 10, making it possible to enhance the conformity at the end portion of the wiper device.

Moreover, the center cover 40 and the extension cover 50 in accordance with the present embodiment can have a fin 40a, 50a formed thereon for increasing the contact pressure by receiving a wind that works like the headwind while the motor vehicle is moving forward.

As shown in FIG. 2, the center cover 40 and the extension cover 50 has the concave fin 40a, 50a formed on a lateral surface thereof so as to receive the wind that works like the headwind while the motor vehicle is moving forward. Accordingly, the center cover 40 and the extension cover 50 can press down the yoke 30 by use of pressure received from the wind and make the contact member 10 in closer contact with the windshield.

Although an embodiment of the present invention has been described, it shall be appreciated that various permutations and modifications are possible by those of ordinary skill in the art to which the present invention pertains without departing from the technical ideas and scopes of the present invention that are defined by the claims appended below.

It shall be also appreciated that there can be many other embodiments than the embodiment described above in the claims of the present invention.

What is claimed is:

1. A wiper device for removing foreign substances that are stuck on a windshield, comprising:
    a contact member configured for wiping out the foreign substances;
    a support member made of an elastic material and configured for elastically supporting the contact member in such a way that the contact member is in close contact with the windshield;
    a yoke configured for supporting the support member;
    a center cover configured for covering the yoke and having a wiper arm connected thereto; and
    an extension cover having one end thereof hinge-coupled to the center cover and the other end thereof extended in a lengthwise direction of the support member, wherein
    the yoke is hinge-coupled with the extension cover and has a hinge-axle thereof arranged in a same line as a hinge-axle connecting the center cover with the extension cover and the yoke has a first hinge groove formed therein, and the extension cover has a first hinge protrusion formed inside thereof for insertion in the first hinge groove, and
    the extension cover has a second hinge groove formed outside thereof corresponding to a position of the first hinge protrusion, and the center cover has a second hinge protrusion formed inside thereof for insertion in the second hinge groove.

2. The wiper device of claim 1, wherein the first hinge protrusion has a greater diameter than the second hinge protrusion.

3. The wiper device according to claim 1, wherein the other end of the extension cover is coupled to at least one of the support member and the contact member.

4. The wiper device according to claim 1, wherein at least one of the center cover and the extension cover has a fin formed thereon for receiving a headwind from moving forward.

5. A wiper device for removing foreign substances that are stuck on a windshield, comprising:
    a contact member configured for wiping out the foreign substances;
    a support member made of an elastic material and configured for elastically supporting the contact member in such a way that the contact member is in close contact with the windshield;
    a yoke configured for supporting the support member;
    a center cover configured for covering the yoke and having a wiper arm connected thereto; and
    an extension cover having one end thereof hinge-coupled to the center cover and the other end thereof extended in a lengthwise direction of the support member, wherein
    the yoke is hinge-coupled with the center cover and has a hinge-axle thereof arranged in a same line as a hinge-axle connecting the center cover with the extension cover and the yoke has a first hinge groove formed therein, and the center cover has a first hinge protrusion formed inside thereof for insertion in the first hinge groove, and
    the center cover has a second hinge groove formed outside thereof corresponding to a position of the first hinge protrusion, and the extension cover has a second hinge protrusion formed inside thereof for insertion in the second hinge groove.

6. The wiper device according to claim 5, wherein the other end of the extension cover is coupled to at least one of the support member and the contact member.

7. The wiper device according to claim 5, wherein at least one of the center cover and the extension cover has a fin formed thereon for receiving a headwind from moving forward.

8. The wiper device of claim 5, wherein the first hinge protrusion has a greater diameter than the second hinge protrusion.

* * * * *